United States Patent
Kim (10) Patent No.: US 7,733,386 B2
(45) Date of Patent: Jun. 8, 2010

(54) METHOD OF CONTROLLING DIGITAL PHOTOGRAPHING DEVICE AND DIGITAL PHOTOGRAPHING DEVICE USING THE SAME

(75) Inventor: Sung-hoon Kim, Seongnami-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 11/820,897

(22) Filed: Jun. 21, 2007

(65) Prior Publication Data

US 2008/0129836 A1 Jun. 5, 2008

(30) Foreign Application Priority Data

Dec. 5, 2006 (KR) .................. 10-2006-0122594

(51) Int. Cl.
*H04N 5/76* (2006.01)

(52) U.S. Cl. ............ 348/231.2; 348/207.1; 348/207.11; 348/231.6; 348/333.04

(58) Field of Classification Search ............... None
See application file for complete search history.

(56) References Cited

U.S. PATENT DOCUMENTS

| | | | |
|---|---|---|---|
| 5,845,166 A * | 12/1998 | Fellegara et al. ............ 396/429 |
| 6,636,264 B1 * | 10/2003 | Nakao et al. ............... 348/375 |
| 6,683,644 B1 * | 1/2004 | Nakao et al. ............... 348/273 |
| 6,867,807 B2 * | 3/2005 | Malloy Desormeaux | 348/333.13 |
| 6,914,625 B1 * | 7/2005 | Anderson et al. ......... 348/222.1 |
| 2002/0097323 A1 * | 7/2002 | Ito ........................... 348/207 |
| 2002/0126323 A1 * | 9/2002 | Dow et al. .................. 358/473 |
| 2004/0051784 A1 * | 3/2004 | Ejima et al. ............. 348/207.99 |
| 2004/0201691 A1 * | 10/2004 | Bryant et al. ............ 348/207.1 |
| 2004/0201744 A1 * | 10/2004 | Akasawa .................. 348/231.6 |
| 2005/0073601 A1 * | 4/2005 | Battles et al. ........... 348/333.05 |
| 2005/0225659 A1 * | 10/2005 | Kazami .................. 348/333.12 |
| 2005/0231611 A1 * | 10/2005 | Anderson et al. ......... 348/231.2 |
| 2007/0236575 A1 * | 10/2007 | Jokinen et al. .......... 348/207.99 |
| 2008/0068486 A1 * | 3/2008 | Kusaka .................. 348/333.02 |

* cited by examiner

*Primary Examiner*—David L Ometz
*Assistant Examiner*—Angel L Garces-Rivera
(74) *Attorney, Agent, or Firm*—Drinker Biddle & Reath LLP (57) ABSTRACT

A method of controlling a digital photographing device for storing an image file obtained by taking a photograph in a storage medium, and reproducing an image file stored in the storage medium to display on a display unit, the method including: marking an image file corresponding to an image last displayed on the display unit when a playback mode for displaying an image on a display unit is terminated; and loading, when a playback mode is started, an image file corresponding to an image that has been last displayed on the display unit when a previous playback mode is terminated, to display on the display unit.

10 Claims, 5 Drawing Sheets

METHOD OF CONTROLLING DIGITAL PHOTOGRAPHING DEVICE AND DIGITAL PHOTOGRAPHING DEVICE USING THE SAME

CROSS-REFERENCE TO RELATED PATENT APPLICATION

This application claims the benefit of Korean Patent Application No. 10-2006-0122594, filed on Dec. 5, 2006, in the Korean Intellectual Property Office, the disclosure of which is incorporated herein in its entirety by reference.

BACKGROUND OF THE INVENTION

1. Field of the Invention

The present invention relates to a method of controlling a digital photographing device and a digital photographing device using the same. More particularly, the present invention relates to a method of controlling a digital photographing device and a digital photographing device using the same that can improve a user's convenience in a playback mode for displaying an image on a display unit.

2. Description of the Related Art

In a conventional digital photographing device, an image file obtained in a photographing operation in a photographing mode is stored in a storage medium, and the image file stored in the storage medium can be loaded and displayed on a display unit in a playback mode. Additionally, the image file obtained in the photographing operation can be displayed in the photographing mode.

When a playback mode is started, the conventional digital photographing device is set to display on the display unit the lastly taken and stored image file. That is, when a user desired image file stored in the storage medium is displayed on the display unit in a playback mode and the playback mode is terminated and then restarted, the lastly taken and stored image file is automatically displayed on the display unit. Therefore, in order to display the desired image file that is displayed on the display unit before the playback mode is terminated, a user must perform a search operation until the desired image is displayed on the display unit. Particularly, when the playback mode is erroneously terminated by incorrect manipulation of a user while the user desired image is being displayed on the display unit, such a problem causes significant user inconvenience.

SUMMARY OF THE INVENTION

The invention provides a method of controlling a digital photographing device and a digital photographing device using the same, which improves a user's convenience in a playback mode for displaying an image on a display unit.

According to an aspect of the invention, an image file is stored in the storage medium of a digital photography device and displayed on the display unit. The image is obtained by taking a photograph with a digital photographing device, when a playback mode for displaying an image on the display unit is terminated, the image file corresponding to an image last displayed on the display unit is marked. Then, when a playback mode is restarted, the marked image file is displayed on the display unit.

According to another aspect of the invention, when a playback mode for displaying an image on the display unit is terminated, the image file corresponding to an image last displayed on the display unit is marked. Then, when the playback mode is restarted, a determination is made regarding whether or not a photographing operation has been performed before the playback mode is started. If it is determined that a photographing operation has been performed before the playback mode is started, the image file that has been last taken and stored in the storage medium before the playback mode is started is loaded and displayed on the display unit. If it is determined that no photographing operation has been performed before the playback mode is started, the image file that is marked as last displayed before the playback mode is terminated is loaded and displayed on the display unit.

In one further aspect of the invention, if it is determined that no photographing operation has been performed before the playback mode is started, a determination is made regarding whether or not there is an image file marked as last displayed. If it is determined that an image file is marked as last displayed, the marked image file is loaded to display on the display unit. If it is determined that there is no image file marked as displayed, an image file that was last taken and stored in the storage medium is loaded to display on the display unit.

On the contrary, if it is determined that a photographing operation has been performed before the playback mode is started, an image file that has been taken and stored in the storage medium before the playback mode is started is loaded to display on the display unit. Afterwards, a further determination is made regarding whether or not there is an image file corresponding to an image that has been last displayed when a previous playback mode is terminated, on a basis of a signal form a user. If it is determined that there is an image file corresponding to the image that has been last displayed when the previous playback mode is terminated, that image file is loaded to display on the display unit. If it is determined that there is no image file corresponding to the image that has been last displayed when the previous playback mode is terminated, an image file that has been previously stored just before the image file corresponding to the image currently displayed on the display unit is loaded to display on the display unit.

Moreover, if it is determined that a photographing operation has been performed before the playback mode is started, an image file that has been previously taken and stored in the storage medium before the playback mode is started is loaded to display on the display unit. Furthermore, on the basis of a signal from a user, either an image file corresponding to an image that has been last displayed on the display unit when the previous playback mode is terminated is loaded on the display unit, or an image file that has been previously stored just before the image file corresponding to an image currently displayed on the display unit is loaded to display on the display unit.

If file is loaded to be displayed on the display unit, a message indicating that there is no target file to display may be displayed on the display unit.

According to another embodiment of the invention, the digital photographing device comprises a computer readable medium of instructions for controlling the digital photographing device for storing an image file obtained by taking a photograph in a storage medium and displaying an image file stored in the storage medium on a display unit. The instructions comprise a first set of instructions operating to mark an image file corresponding to an image last displayed on the display unit when a playback mode for displaying an image on the display unit is terminated; and a second set of instructions operating to load, when a playback mode is started, an image file corresponding to an image last displayed on the display unit when the previous playback mode is terminated, to display on the display unit.

If no file is loaded to display on the display unit, the second set of instructions may operate to display on the display unit a message indicating that there is no target file to be display.

According to another aspect of the present invention, the computer readable medium of instructions comprises: a first set of instructions operating to mark an image file corresponding to an image last displayed on the display unit when a playback mode for displaying an image on the display unit is terminated; a second set of instructions operating to determine, when a playback mode is started, whether or not a photographing operation has been performed before the playback mode is started; and a third set of instructions operating to load an image file to display on the display unit. If it is determined that a photographing operation has been performed before the playback mode is started, the third set of instructions operates to load an image file that has been taken and stored in the storage medium before the playback mode is started to display on the display unit. If it is determined that no photographing operation has been performed before the playback mode is started, the third set of instructions operates to load an image file corresponding to the image last displayed on the display unit among image files stored in the storage medium to display on the display unit.

If no file is loaded to be displayed on the display unit, the third set of instructions may operate to display a message indicating that there is no target file to display.

If it is determined that no photographing operation has been performed before the playback mode is started, the instructions may further comprise: a fourth set of instructions operating to determine whether or not there is an image file corresponding to the image last displayed on the display unit among the image files stored in the storage medium before the image is displayed on the display unit; and a fifth set of instructions operating to load an image file to display on the display unit. If it is determined that there is an image file corresponding to the image last displayed on the display unit, the fifth set of instructions operates to load that image file to display on the display unit. If it is determined that there is no image file corresponding to the image last displayed on the display unit, the fifth set of instructions operates to load an image file last taken and stored in the storage medium among the image files stored in the storage medium to display it on the display unit.

If no file is loaded to be displayed on the display unit, the fifth set of instructions may operate to display a message indicating that there is no target file to display.

If it is determined that a photographing operation has been performed before the playback mode is started, the instructions may further comprise: a fourth set of instructions operating to load an image file that has been taken and stored in the storage medium before the playback mode is started to display on the display unit; a fifth set of instructions operating to determine whether or not there is an image file corresponding to an image that has last displayed on the display unit when a previous playback mode is terminated, on a basis of a signal from a user; and a sixth set of instructions operating to load an image file to display on the display unit. If it is determined that there is an image file corresponding to the image that has last displayed on the display unit when the previous playback mode was terminated, the sixth set of instructions operates to load that image file to display on the display unit. If it is determined that there is no image file corresponding to an image that has been last displayed on the display unit when the previous playback mode is terminated, the sixth set of instructions operates to load an image file that has been previously stored just before the image file corresponding to an image currently displayed on the display unit to display on the display unit.

If no file is loaded to be displayed on the display unit, the sixth set of instructions may operate to display a message indicating that there is no target file to display.

If it is determined that a photographing operation has been performed before the playback mode is started, the instructions may further comprise: a fourth set of instructions operating to load an image file that has been previously taken and stored in the storage medium before the playback mode is started to display on the display unit; and a fifth set of instructions operating to load an image file to display on the display unit. On the basis of a signal from a user, the fifth set of instructions operates to either load an image file corresponding to an image that has been last displayed on the display unit when the previous playback mode is terminated, or to load an image file that has been previously stored just before the image file corresponding to an image currently displayed on the display unit to display on the display unit.

If no file is loaded to be displayed on the display unit, the fifth set of instructions may operate to display a message for indicating that there is no target file to display.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiment of the invention will be described in detail with reference to the accompanying drawings.

Figure 1:
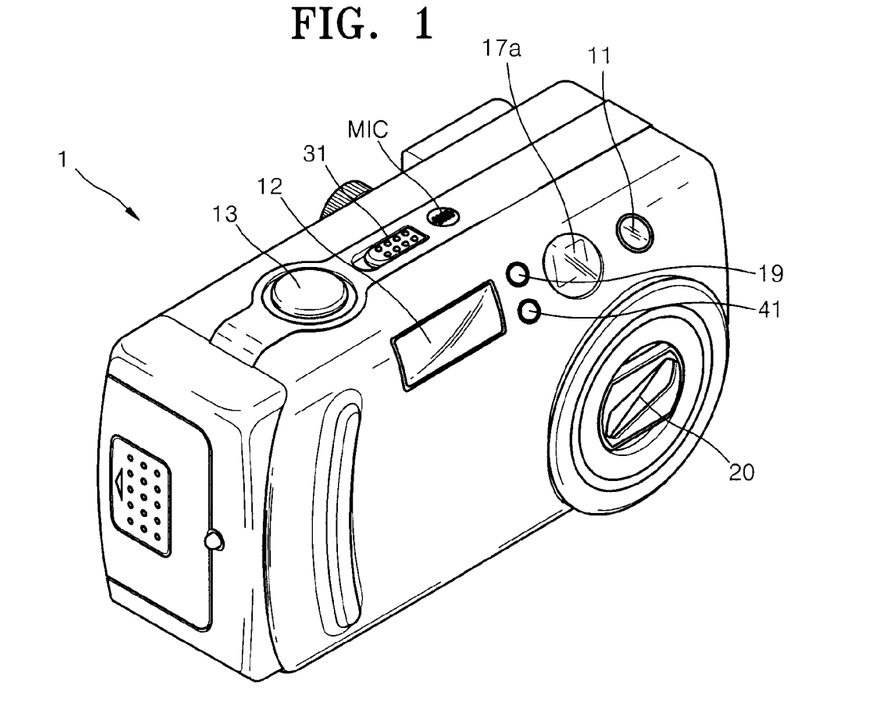
FIG. 1 is a perspective view schematically illustrating a digital photographing device according to an exemplary embodiment of the invention.
Figure 2:
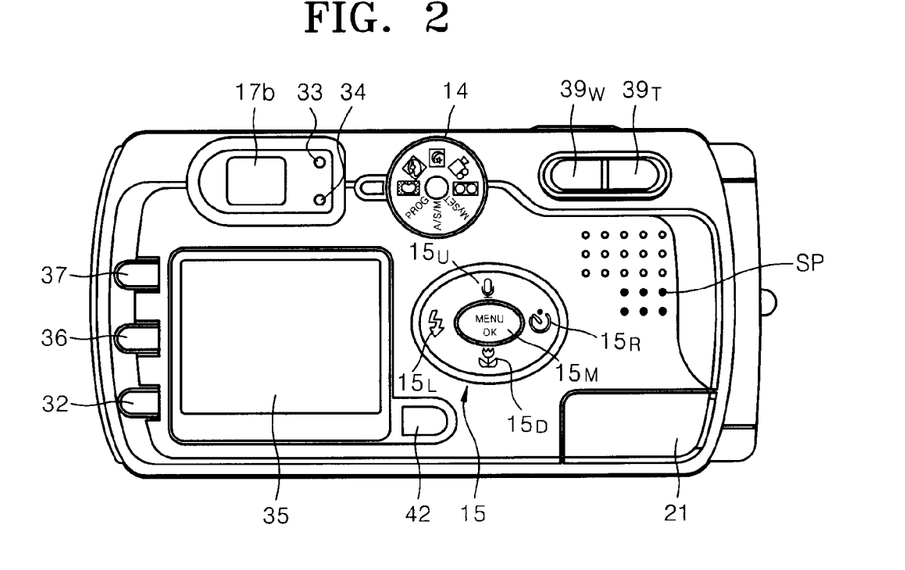
FIG. 2 is a rear side view of the digital photographing device of FIG. 1.

FIG. 1 is a perspective view schematically illustrating a digital photographing device 1 according to an exemplary embodiment of the invention, and FIG. 2 is a rear side view of the digital photographing device 1 of FIG. 1.

Referring to FIG. 1, the digital photographing device 1 includes on a front face thereof a microphone MIC, a self-timer lamp 11, a flash light 12, a shutter release button 13, a view finder 17a, a flash-light sensor 19, a power switch 31, a lens unit 20, and a remote receiver 41.

The self-timer lamp 11 operates during a setup time from a time when the shutter release button 13 is pressed to a time when an image starts to be captured in a self-timer mode. The flash-light sensor 19 detects an amount of light when the flash 12 is turned on, and inputs a signal corresponding to the detected amount of light to the digital photographing device processor (not shown) through a micro-controller (not shown). The remote receiver 41 receives a command signal such as an image pickup command from the remote controller (not shown) and inputs it to the digital photographing device processor through the microcontroller.

Referring to FIG. 2, according to an embodiment of the present invention, the digital photographing device 1 further includes on a rear face thereof a mode dial 14, a set of function buttons 15, a manual-focusing/delete/scale-down button 36, a manual-adjustment/playback/stop/scale-up button 37, a playback mode button 42, a speaker SP, a monitor button 32, an auto-focus lamp 33, a view finder 17b, a flash standby lamp 34, a display unit 35, a wide-angle zoom button 39W, a telephoto-zoom button 39T, and an external interface unit 21.

The mode dial 14 is used by a user to select one of many operation modes such as an easy shot mode, a programmed shot mode, a portrait shot mode, a night shot mode, a manual shot mode, a moving-picture shot mode, a user setup mode and a recording mode.

The function buttons 15 are used by the user to select a particular function of the digital photographing device 1 or move a location of an image when displaying the image on the display unit 35. Also, the function buttons 15 are used as directional-movement buttons of an activation cursor on a menu screen of the display unit 35.

The manual-adjustment/playback/stop/scale-up button 37 is used to manually adjust specific conditions. In a playback mode, when the user selects one of the moving-picture files and presses the manual-adjustment/playback/stop/scale-up button 37, the selected moving-picture file may start or stop being displayed. In addition, the manual-adjustment/playback/stop/scale-up button 37 can be used to decrease a displaying scale of a second image on the display unit 35.

The manual-focusing/delete/scale-down button 36 can be used by the user to manually adjust a focusing point in a photographing mode or perform a delete operation. In addition, the manual-focusing/delete/scale-down button 36 can be used to increase the displaying scale of the second image on the display unit 35. The monitor button 32 can be used by the user to control operations of the display unit 35. The playback mode button 42 can be used to convert the mode into a playback or photographing mode.

The auto-focus lamp 33 is operated when an image is appropriately focused. The flash standby lamp 34 is operated when the flash 12 is in a standby state. The mode indication lamp 14L indicates the selected mode of the mode dial 14.

The digital photographing device shown in FIGS. 1 and 2 can also be a camera, for example, a lens-substitutable camera, a single lens reflex (SLR) camera, or a camcorder.

In the digital photographing device 1 of the present embodiment, an image file stored in a storage medium is displayed on the display unit 35 in a playback mode. In addition, using the function buttons 15, image files immediately proceeding and following the selected image file can be displayed on the display unit 35.

Unlike conventional digital photographing devices, in the digital photographing device 1 of the present embodiment, the image file last displayed on the display unit 35 when the playback mode for displaying an image on the display unit 35 is terminated is marked. The playback mode can be terminated when other modes are used or the digital photographing device is turned off. As described above, the digital photographing device 1 of the present embodiment marks the image file last displayed on the display unit 35 when the playback mode is terminated. In this case, the image file may be marked using various methods. For example, information regarding the location of the image file may be stored in the storage medium of the digital photographing device 1. Also, a separate memory device can be used in the digital photographing device, and information regarding the location of the selected image file in the storage medium may be stored in this memory device.

If the image file last displayed on the display unit 35 is marked when the playback mode is terminated as described above, and then, the playback mode is restarted, one of the image files stored in the storage medium is displayed on the display unit 35. In this case, according to the digital photographing device 1 of the present embodiment, the image file that has been last displayed on the display unit 35 when the previous playback mode is terminated is displayed on the display unit 35.

According to the digital photographing device 1 and a method of controlling the same of the present embodiment, the image that has been displayed on the display unit 35 when the playback mode is terminated is displayed again on the display unit 35 when the playback mode is restarted. As a result, even when the playback mode is erroneously terminated by incorrect key manipulation of a user, the image a user has been watching can be displayed on the display unit 35 by restarting the playback mode. Therefore, unlike a conventional digital photographing device, in which the image last stored in the storage medium is always displayed on the display unit 35 when the playback mode is started, the present invention can significantly improve a user's convenience. When a target file to be displayed on the display unit 35 does not exist, a message indicating that there is no target file to display may be displayed on the display unit 35. This can be similarly applied to other embodiments.

Figure 3:
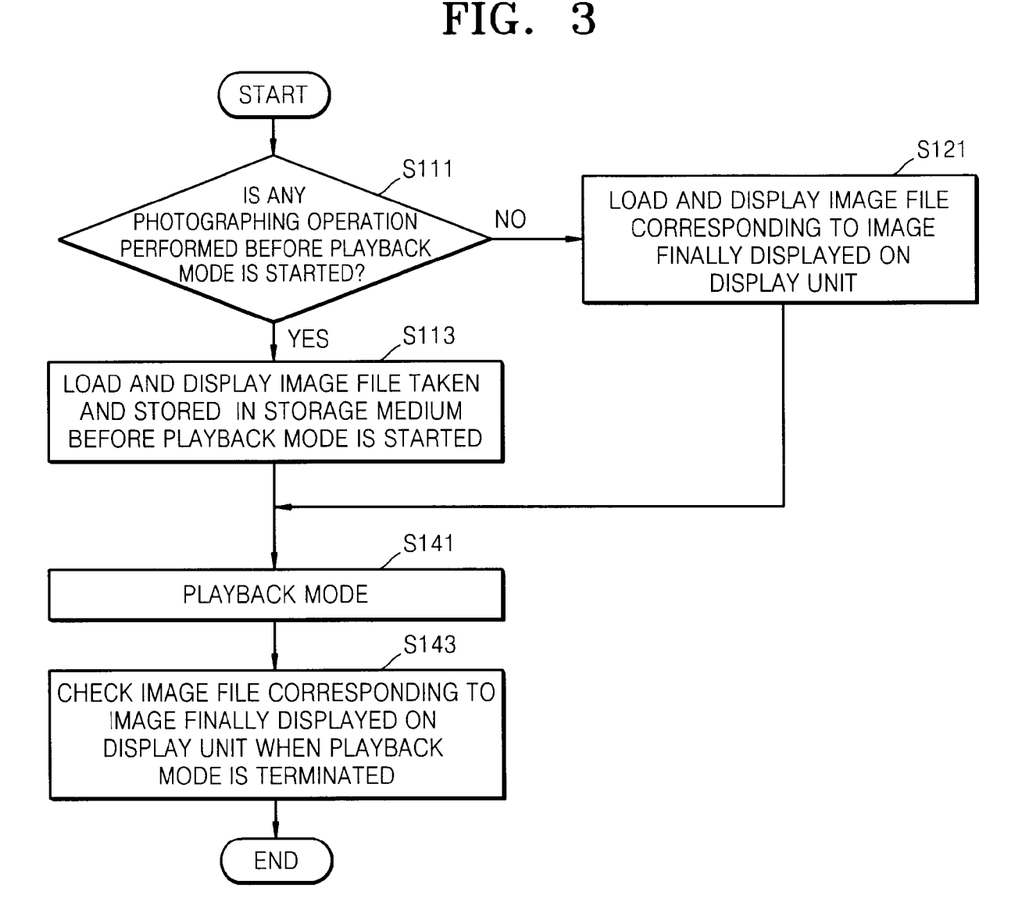
FIG. 3 is a flowchart of a method of controlling a digital photographing device according to an exemplary embodiment of the invention.

FIG. 3 is a flowchart of a method of controlling a digital photographing device according to an exemplary embodiment of the invention.

Similar to the aforementioned embodiment, in the present embodiment, an image file corresponding to the image last displayed on the display unit when a playback mode for displaying an image on the display unit is terminated is marked. Furthermore, when the playback mode for displaying an image on the display unit is started, a determination is made regarding whether or not a photographing operation has been performed before the playback mode is started (S111). Accordingly, if it is determined that a photographing operation has been performed before the playback mode is started, an image file that has been taken and stored in a storage medium before the playback mode is started is displayed on the display unit (S113). If it is determined that no photographing operation has been performed before the playback mode is started, an image file corresponding to the image last displayed on the display unit from among the image files stored in the storage medium is displayed on the display unit (S121).

Unlike the aforementioned embodiment, in the present embodiment, the operation S111, which determines whether or not a photographing operation has been performed before the playback mode is started, is performed when the playback mode is restarted. This is because, when a user selects a playback mode after a photograph is taken, the user may typically want to see an image of an image file just previously taken and stored in the storage medium instead of an image that has been last displayed in the previous playback mode. The method of the aforementioned embodiment and the method of the present embodiment may be selectively applied in the same digital photographing device of the present invention depending on selection of a user. Such a construction may be similarly applied to other embodiments.

After the above processes are completed, a conventional playback mode is initiated (S141). It should be noted that, in the conventional playback mode, various operations similar to those of the playback mode of the conventional digital photographing device are performed. For example, image files preceding and following the image file corresponding to the image currently displayed on the display unit may be displayed on the display unit, or an image file corresponding to the image currently displayed on the display unit may be deleted according to a user's instruction. Then, an image file corresponding to the image last displayed on the display unit is marked when the playback mode is terminated according to a signal from a user (S143).

As described above, according to the present embodiment, an image file corresponding to the image last displayed on the display unit in the previous playback mode is displayed on the display unit when a playback mode is started. Furthermore, when a photographing operation has been performed before the playback mode is started, an image file taken before the playback mode is started and stored in the storage medium is displayed on the display unit. Unlike a conventional digital photographing device, in which the image file last taken and stored in the storage medium is displayed on the display unit regardless of whether or not a photographing operation has been performed before the playback mode was started, the present invention can maximize a user's convenience.

Figure 4:
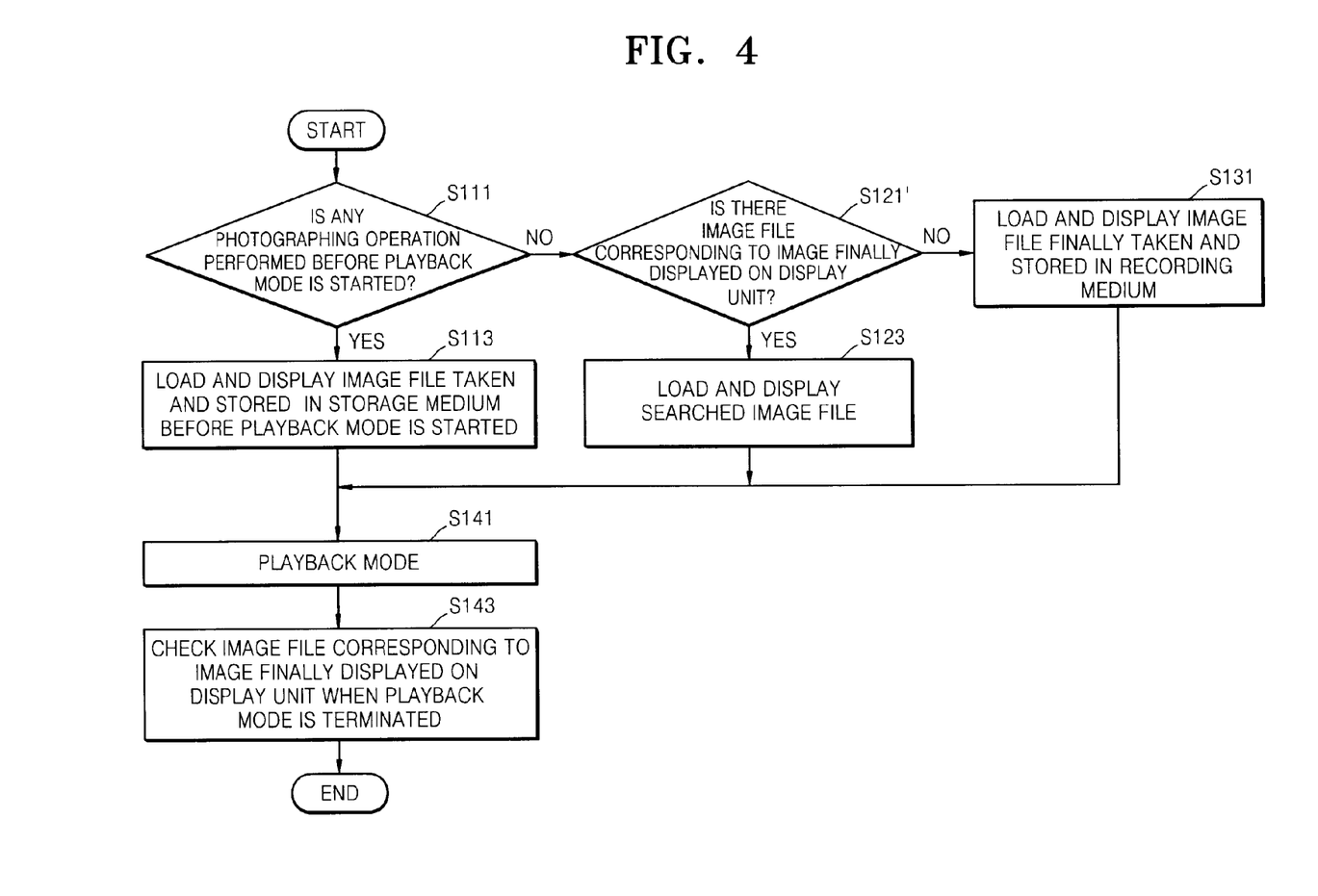
FIG. 4 is a flowchart of a method of controlling a digital photographing device according to another embodiment of the present invention.

FIG. 4 is a flowchart of a method of controlling a digital photographing device according to another embodiment of the present invention.

Similar to the aforementioned embodiments, in the method of controlling a digital photographing device of the present embodiment, an image file corresponding to the image last displayed on the display unit when the playback mode is terminated, is marked. In addition, a determination is made regarding whether or not a photographing operation has been performed before the playback mode is started when the playback mode for displaying an image on the display unit is started (S111). Accordingly, if it is determined that a photographing operation has been performed before the playback mode is started, an image file taken and stored in the storage medium before the playback mode is started is displayed on the display unit (S113).

On the contrary, if it is determined that no photographing operation has been performed before the playback mode is started, the present embodiment would perform differently from those described above with reference to FIG. 3. According to the present embodiment, if it is determined that no photographing operation has been performed before the playback is started, a further determination is made regarding whether or not there is an image file corresponding to the image last displayed on the display unit from among the image files stored in the storage medium before the image is displayed on the display unit (S121'). Accordingly, if it is determined that there is an image file corresponding to the image last displayed on the display unit, that image file is displayed on the display unit (S123). On the contrary, if it is determined that there is no image file corresponding to the image last displayed on the display unit, an image file last taken and stored in the storage medium from among image files stored in the storage medium is displayed on the display unit (S131).

Generally, a storage medium for the digital photographing device, such as a CF card, an SD card, or a memory stick can be removed from the digital photographing device. Therefore, after one of the image files stored in the storage medium is displayed on a display unit during a playback mode, the storage medium may be removed from the digital photographing device and then connected to a computer or other information devices. In this case, an image file corresponding to the image that has been displayed on the display unit when the playback mode is terminated may be deleted from the image files stored in the storage medium on a computer. Then, when the storage medium is installed again in the digital photographing device, and a playback mode is initiated, an image file corresponding to the image that has been displayed on the display unit when the previous playback mode is terminated would not be found. Therefore, in such a case, i.e., when there is no image file corresponding to the image last displayed on the display unit, an image file last taken and stored in the storage medium from among the image files stored in the storage medium is displayed on the display unit (S131).

After the above process, a typical playback mode is initiated (S141). An image file corresponding to the image last displayed on the display unit when the playback mode is terminated is marked in response to a user's instruction.

According to the present embodiment, an image file corresponding to the image that has been last displayed on the display unit in the previous playback mode is displayed on the display unit when the playback mode is started. Furthermore, if it is determined that a photographing operation has been performed before the playback mode is started, an image file taken and stored in the storage medium before the playback mode is started is displayed on the display unit. Therefore, unlike a conventional digital photographing device, in which an image file last taken and stored in the storage medium is always displayed on the display unit regardless of whether or not a photographing operation has been performed before the playback mode is started, the present invention may maximize a user's convenience. In addition, if no photographing operation has been performed before the playback mode is started, a determination is made regarding whether or not there is any image files corresponding to the image last displayed on the display unit in the storage medium, and then, different images may be displayed on the display unit based on the determination. Thus, a user's convenience can be significantly improved.

Figure 5:
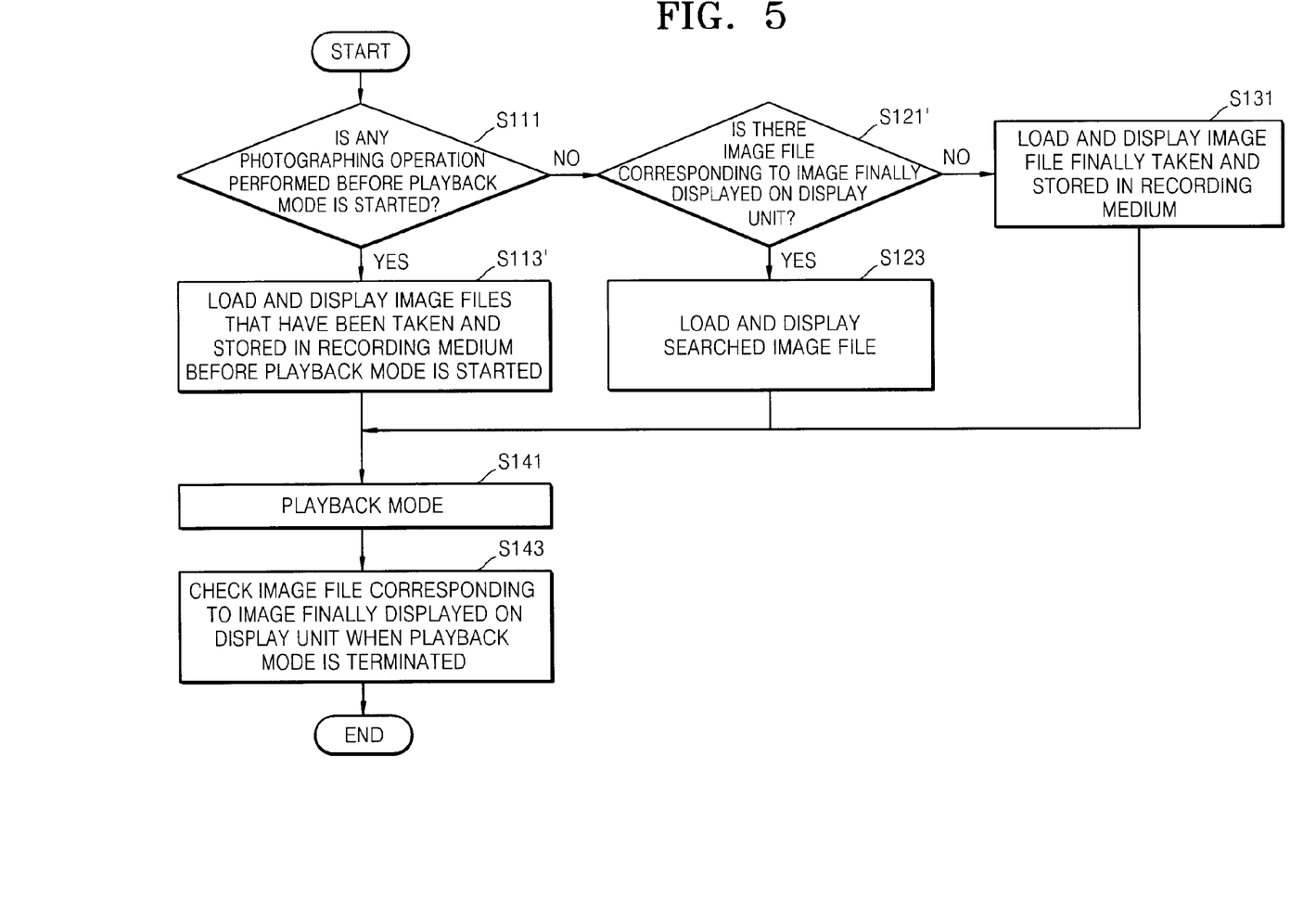
FIG. 5 is a flowchart of a method of controlling a digital photographing device according to another embodiment of the invention.

FIG. 5 is a flowchart of a method of controlling a digital photographing device according to another embodiment of the invention.

Unlike the embodiment described with reference to FIG. 4, according to the present embodiment, a determination is made when the playback mode is started regarding whether or not a photographing operation has been performed before the playback mode is started (S111). As a result, if it is determined that a photographing operation has been performed before the playback mode is started, an image file taken and stored in the storage medium before the playback mode is started is displayed on the display unit (S113).

In some cases, the photographing operation may have been performed a plurality of times after the playback mode is terminated. Accordingly, in the present embodiment, a determination is made after the playback mode is started regarding whether or not a photographing operation has been performed before the playback mode is started (S111). As a result, if it is determined that a plurality of photographing operations have been performed before the playback mode is started, image files taken and stored in the storage medium are displayed on the display unit (S113'). When the image files taken and stored in the storage medium are displayed on the display unit, the image file last taken and stored in the storage medium before the playback mode is started is displayed on the display unit, and then, an image file that has been previously stored in the storage medium just before the last image file is stored in the storage medium is displayed on the display unit. When there are other images taken and stored in the storage medium before the playback mode is started, an image file that has been previously stored in the storage medium just before the image file corresponding to the image displayed on the display unit is stored in the storage medium may be displayed on the display unit in response to a user's instruction.

Through the aforementioned processes, image files that have been taken and stored by a user after the previous playback mode is terminated can be directly loaded when the playback mode is restarted. As a result, a user's convenience may be improved.

Figure 6:
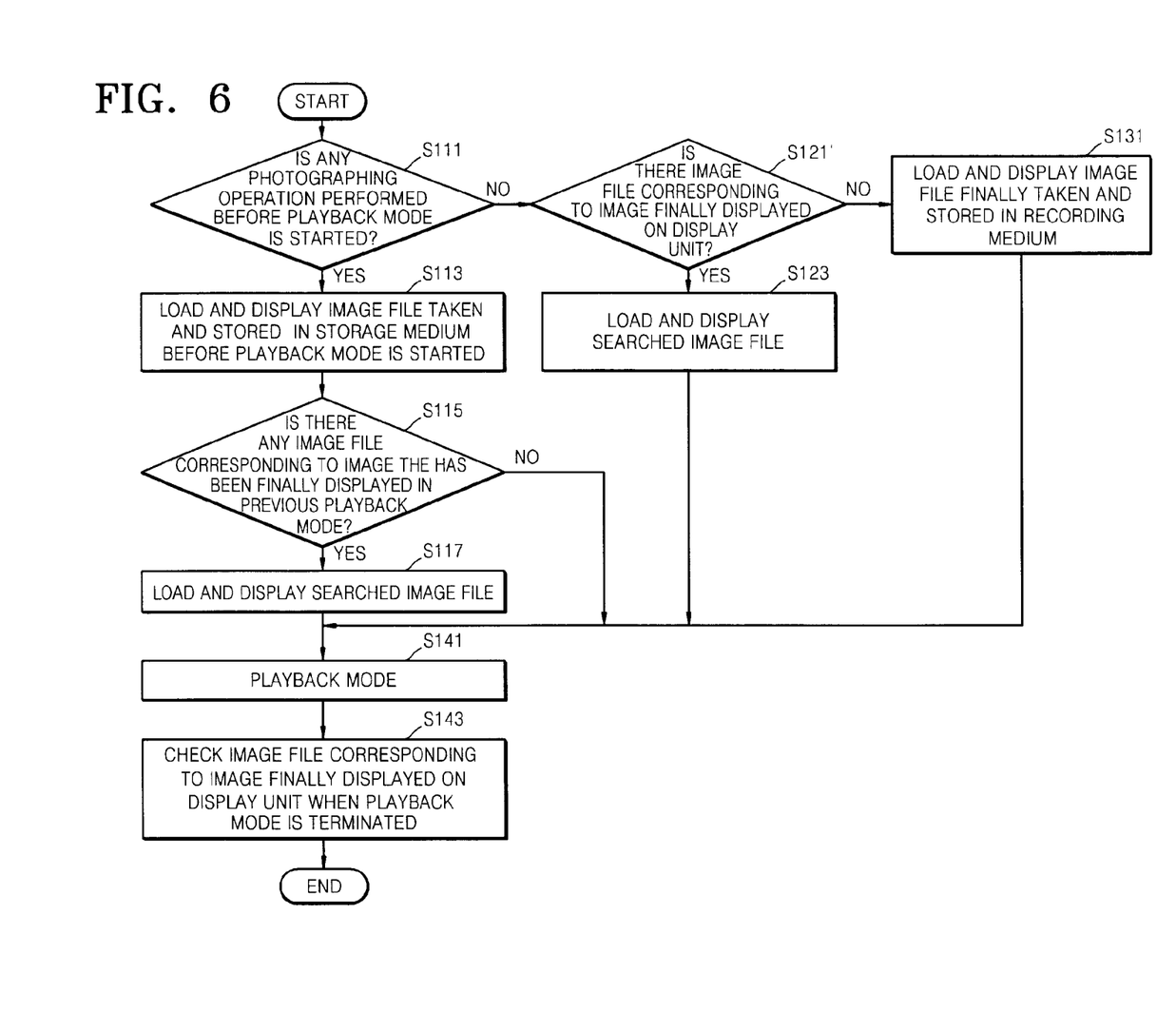
FIG. 6 is a flowchart of a method of controlling a digital photographing device according to another embodiment of the invention.

FIG. 6 is a flowchart of a method of controlling a digital photographing device according to another embodiment of the invention.

Unlike the embodiment described with reference to FIG. 4, according to the present embodiment, a determination is made when the playback mode is started whether or not a photographing operation has been performed before the playback mode is started (S111). Accordingly, if it is determined that a photographing operation has been performed before the playback mode is started, an image file that has been taken and stored in the storage medium before the playback mode is started is displayed on the display unit (S113). Then, when there is a signal from a user, a determination is made regarding whether or not there is an image file corresponding to the image last displayed on the display unit in the previous playback mode (S115). The signal from the user may be a signal for changing the image currently displayed on the display unit, or a signal for deleting the image file corresponding to the image currently displayed on the display unit from the storage medium.

As a result, if it is determined that there has been no image file corresponding to the image last displayed on the display unit in the previous playback mode, a typical playback mode is initiated (S141). For example, an image that has been previously stored just before the image file corresponding to the image currently displayed on the display unit is stored may be displayed on the display unit from among the image files stored in the storage medium.

As a result, if it is determined that there is an image file corresponding to the image finally displayed on the display unit when the previous playback mode is terminated, that image file is displayed on the display unit (S117).

According to the present embodiment, when one of the image files stored in the storage medium in the playback mode is displayed on the display unit and the mode is changed to a photographing mode, then a photographing operation is performed, afterwards, the playback mode is restarted, an image file that has been taken and stored before the playback mode is started is displayed on the display unit. Then, if there is a signal for changing the image displayed on the display unit from a user, an image file corresponding to the image that has been last displayed on the display unit in the previous playback mode is displayed on the display unit. Such a process can be very convenient when a user watches an image in a playback mode, takes a photograph similar to that image, and wants to compare the image that has been displayed in the previous playback mode and the image newly taken. Therefore, the present embodiment may significantly improve a user's convenience.

The method of the present embodiment as described with reference to FIG. 6, may be variously modified. For example, when the playback mode for displaying an image in the display unit is started as shown in FIG. 6, a determination is made regarding whether or not a photographing operation has been performed before the playback mode is started (S111). Accordingly, if it is determined that a photographing operation has been performed before the playback mode is started, the image file that has been taken and stored in the storage medium before the playback mode is started is displayed on the display unit (S113).

However, when there is a signal from a user, such as a signal for changing the image currently displayed on the display unit, or a signal for deleting an image file corresponding to the image currently displayed on the display unit, a selection menu is displayed on the display unit, unlike in the embodiment described with reference to FIG. 6. In this case, the menu may relate to determination of (a) whether or not an image file corresponding to the image that has been last displayed on the display unit when the previous playback mode is terminated is displayed on the display unit; or (b) whether or not an image file that has been previously stored just before the image file corresponding to the image currently displayed on the display unit is stored is displayed on the display unit. Depending on a selection of a user, an image file corresponding to the image that has been last displayed on the display unit in the previous playback mode or an image file that has been previously stored just before the image file corresponding to the image currently displayed on the display unit is displayed on the display unit. Then, a conventional playback mode is performed. It should be noted that, in the conventional playback mode, an image file that has been previously stored just before an image file corresponding to the image currently displayed on the display unit is stored may be displayed on the display unit from among image files stored in the storage medium.

A program for executing the control method of the digital photographing apparatus according to the embodiments and variations of the present invention can be stored in a storage medium, for example, a computer readable medium. The storage medium storing the control method of the digital photographing apparatus may be a storage medium of the digital photographing apparatus or a memory of the digital photographing apparatus. Alternatively, it may also be a separate storage medium. Examples of the storage medium include magnetic storage medium (for example, read-only memory (ROM), and hard disks) and optical data storage devices (for example, CD-ROM, digital versatile disc (DVD)). Also, a CPU or part of the CPU of a digital photographing apparatus may be employed as the storage medium.

The present invention may improve a user's convenience in a playback mode for displaying an image on a display unit.

While the present invention has been particularly shown and described with reference to exemplary embodiments thereof, it would be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a digital photographing device including a storage medium and a display unit, the storage medium storing at least one image file and the display unit displaying the at least one image file stored in the storage medium, the method comprising:

defining a marked image file corresponding to the at least one image file displayed on the display unit when terminating a playback mode displaying the at least one image file on the display unit;

determining if a photographing operation has been performed before the playback mode is restarted, including:

displaying on the display unit a most recently photographed image file when restarting the playback mode if the photographing operation has been performed before the playback mode is restarted; and displaying on the display unit the marked image file when restarting the playback mode if the photographing operation has not been performed before the playback mode is restarted, wherein the displaying the marked image file on the display unit when restarting the playback mode if the photographing operation has not been performed before the playback mode is restarted comprises:

determining if the marked image file is stored in the storage medium, including:

displaying on the display unit the marked image file when the marked image file is stored in the storage medium; and displaying on the display unit the most recently photographed image stored in the storage medium when the marked image file is not stored in the storage medium.

2. The method of claim 1, further comprising:
displaying on the display unit a message when the marked image file is not stored in the storage medium.

3. A method of controlling a digital photographing device including a storage medium and a display unit, the storage medium storing at least one image file and the display unit displaying the at least one image file stored in the storage medium, the method comprising:

defining a marked image file corresponding to the at least one image file displayed on the display unit when terminating a playback mode displaying the at least one image file on the display unit;

determining if a photographing operation has been performed before the playback mode is restarted, including:

displaying on the display unit a most recently photographed image file when restarting the playback mode if the photographing operation has been performed before the playback mode is restarted; and displaying on the display unit the marked image file when restarting the playback mode if the photographing operation has not been performed before the playback mode is restarted, wherein displaying on the display unit the most recently photographed image file when restarting the playback mode if the photographing operation has been performed before the playback mode is restarted further comprises:

displaying on the display unit any of the at least one image files stored in the storage medium before the playback mode is restarted;

displaying on the display unit the marked image stored in the storage medium in response to a user selecting the marked image file; and displaying on the display unit the most recently photographed image stored in the storage medium in response to the user selecting the most recently photographed image file.

4. The method of claim 3, further comprising:
displaying on the display unit a message when there is no marked image file.

5. A non-transitory computer readable medium of instructions for controlling a digital photographing device for storing an image file in a storage medium and displaying an image file stored in the storage medium on a display unit, wherein the image file is obtained by taking a photograph, comprising:

a first set of instructions operating to mark an image file corresponding to an image last displayed on the display unit when a playback mode for displaying an image on the display unit is terminated;

a second set of instructions operating to determine, when the playback mode is started, whether or not a photographing operation has been performed before the playback mode is started; and a third set of instructions operating to load an image file to display on the display unit, including:

if a photographing operation has been performed before the playback mode is started, the third set of instructions operates to load an image file corresponding to an image that has been taken and stored in the storage medium before the playback mode is started; and if no photographing operation has been performed before the playback mode is started, the third set of instructions operates to load an image file among image files stored in the storage medium corresponding to an image last displayed on the display unit, wherein, if no photographing operation has been performed before the playback mode is started, further comprising:

a fourth set of instructions operating to determine whether or not there exists an image file among image files stored in the storage medium corresponding to an image last displayed on the display unit before the image is displayed on the display unit; and a fifth set of instructions operating to load an image file to display on the display unit, including:

if there exists an image file corresponding to the image last displayed on the display unit, the fifth set of instructions operates to load the image file corresponding to the image last displayed, and if there is no image file corresponding to the image last displayed on the display unit exists, the fifth set of instructions operates to load an image file among image files stored in the storage medium corresponding to an image last taken and stored in the storage medium.

6. A non-transitory computer readable medium of instructions of claim 5, further comprising:

an additional set of instructions operating to display on the display unit a message indicating when there is no image file corresponding to the image last displayed on the display unit.

7. A non-transitory computer readable medium of instructions for controlling a digital photographing device for storing an image file in a storage medium and displaying an image file stored in the storage medium on a display unit, wherein the image file is obtained by taking a photograph, comprising:

a first set of instructions operating to mark an image file corresponding to an image last displayed on the display unit when a playback mode for displaying an image on the display unit is terminated;

a second set of instructions operating to determine, when the playback mode is started, whether or not a photographing operation has been performed before the playback mode is started; and a third set of instructions operating to load an image file to display on the display unit, including:

if a photographing operation has been performed before the playback mode is started, the third set of instructions operates to load an image file corresponding to an image that has been taken and stored in the storage medium before the playback mode is started; and if no photographing operation has been performed before the playback mode is started, the third set of instructions operates to load an image file among image files stored in the storage medium corresponding to an image last displayed on the display unit, wherein, if a photographing operation has been performed before the playback mode is started, further comprising:

a fourth set of instructions operating to load an image file corresponding to an image that has been taken and stored in the storage medium before the playback mode is started to display on the display unit;

a fifth set of instructions operating to determine whether or not there exists an image file corresponding to an image that has been last displayed on the display unit base on a signal from a user when a previous playback mode is terminated; and a sixth set of instructions operating to load an image file to display on the display unit, including:

if there exists an image file corresponding to an image that has been last displayed on the display unit when the previous playback mode is terminated, the sixth set of instructions operates to load the image file corresponding to the image that has been last displayed; and if no image file corresponding to an image that has been last displayed exists, the sixth set of instructions operates to load an image file that has been stored just before the image file corresponding to an image currently displayed on the display unit.

8. A non-transitory computer readable medium of instructions of claim 7, further comprising:

an additional set of instructions operating to display on the display unit a message indicating when there is no image file corresponding to the image last displayed on the display unit.

9. A non-transitory computer readable medium of instructions for controlling a digital photographing device for storing an image file in a storage medium and displaying an image file stored in the storage medium on a display unit, wherein the image file is obtained by taking a photograph, comprising:

a first set of instructions operating to mark an image file corresponding to an image last displayed on the display unit when a playback mode for displaying an image on the display unit is terminated;

a second set of instructions operating to determine, when the playback mode is started, whether or not a photographing operation has been performed before the playback mode is started; and a third set of instructions operating to load an image file to display on the display unit, including:

if a photographing operation has been performed before the playback mode is started, the third set of instructions operates to load an image file corresponding to an image that has been taken and stored in the storage medium before the playback mode is started; and if no photographing operation has been performed before the playback mode is started, the third set of instructions operates to load an image file among image files stored in the storage medium corresponding to an image last displayed on the display unit, wherein, if a photographing operation has been performed before the playback mode is started, further comprising:

a fourth set of instructions operating to load an image file corresponding to an image that has been previously taken and stored in the storage medium before the playback mode is started to display on the display unit; and a fifth set of instructions operating to load an image file to display on the display unit, including:

the fifth set of instructions operates to load an image file corresponding to an image that has been last displayed on the display unit when the previous playback mode is terminated if a user selects the image file corresponding to the image that has been last displayed; and the fifth set of instructions operates to load an image file that has been previously stored just before an image file corresponding to an image currently displayed on the display unit if a user selects the image file corresponding to an image currently displayed on the display unit.

10. The non-transitory computer readable medium of instructions of claim 9 further comprising:

an additional set of instructions operating to display on the display unit a message indicating when there is no image file corresponding to the image last displayed on the display unit.

* * * * *

UNITED STATES PATENT AND TRADEMARK OFFICE
CERTIFICATE OF CORRECTION

| | |
|---|---|
| PATENT NO. | : 7,733,386 B2 |
| APPLICATION NO. | : 11/820897 |
| DATED | : June 8, 2010 |
| INVENTOR(S) | : Sung-hoon Kim |

It is certified that error appears in the above-identified patent and that said Letters Patent is hereby corrected as shown below:

ON THE TITLE PAGE:

In (75) replace "Seongnami-si" with --Seongnam-si--

IN THE CLAIMS:

In Claim 6, Column 12, line 47, replace "A non-transitory computer readable medium" with -- The non-transitory computer readable medium --

In Claim 8, Column 13, line 36, replace "A non-transitory computer readable medium" with -- The non-transitory computer readable medium --

Signed and Sealed this
Thirty-first Day of May, 2011

David J. Kappos
*Director of the United States Patent and Trademark Office*